US012334495B2

(12) United States Patent
Matsuo et al.

(10) Patent No.: US 12,334,495 B2
(45) Date of Patent: Jun. 17, 2025

(54) SLURRY COMPOSITION FOR ALL-SOLID-STATE SECONDARY BATTERY, SOLID ELECTROLYTE-CONTAINING LAYER, ALL-SOLID-STATE SECONDARY BATTERY, AND METHOD OF PRODUCING SLURRY COMPOSITION FOR ALL-SOLID-STATE SECONDARY BATTERY

(71) Applicant: ZEON CORPORATION, Tokyo (JP)

(72) Inventors: Yusaku Matsuo, Tokyo (JP); Yasuhiro Wakizaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 660 days.

(21) Appl. No.: 17/595,563

(22) PCT Filed: May 15, 2020

(86) PCT No.: PCT/JP2020/019520
§ 371 (c)(1),
(2) Date: Nov. 19, 2021

(87) PCT Pub. No.: WO2020/241322
PCT Pub. Date: Dec. 3, 2020

(65) Prior Publication Data
US 2022/0263112 A1    Aug. 18, 2022

(30) Foreign Application Priority Data
May 31, 2019 (JP) ................................. 2019-102394

(51) Int. Cl.
| H01M 10/056 | (2010.01) |
| H01M 4/13 | (2010.01) |
| H01M 4/139 | (2010.01) |
| H01M 4/62 | (2006.01) |
| H01M 50/414 | (2021.01) |
| H01M 50/431 | (2021.01) |
| H01M 50/443 | (2021.01) |

(52) U.S. Cl.
CPC .......... *H01M 10/056* (2013.01); *H01M 4/13* (2013.01); *H01M 4/139* (2013.01); *H01M 4/62* (2013.01); *H01M 4/622* (2013.01); *H01M 50/414* (2021.01); *H01M 50/431* (2021.01); *H01M 50/443* (2021.01); *H01M 2300/0065* (2013.01); *H01M 2300/0068* (2013.01); *H01M 2300/0071* (2013.01); *H01M 2300/0091* (2013.01)

(58) Field of Classification Search
CPC .......... H01M 4/13; H01M 4/139; H01M 4/62; H01M 4/622; H01M 2300/0065; H01M 2300/0068; H01M 2300/0071; H01M 2300/0091; H01M 10/056; H01M 10/0562; H01M 10/0525; H01M 10/0565
See application file for complete search history.

(56) References Cited

U.S. PATENT DOCUMENTS

| | | | |
|---|---|---|---|
| 9,276,263 B2 | 3/2016 | Yoshida et al. | |
| 10,797,343 B2 | 10/2020 | Maeda | |
| 11,145,866 B2 | 10/2021 | Maeda et al. | |
| 2013/0040206 A1 | 2/2013 | Yoshida et al. | |
| 2014/0120375 A1* | 5/2014 | Takizawa ............... | G11B 5/855 |
| | | | 428/836 |
| 2014/0121329 A1 | 5/2014 | Araki et al. | |
| 2014/0127579 A1* | 5/2014 | Yoshida ................ | H01M 4/621 |
| | | | 429/306 |
| 2015/0050554 A1 | 2/2015 | Fukumine et al. | |
| 2018/0062162 A1* | 3/2018 | Maeda ................... | H01M 4/625 |
| 2018/0076481 A1 | 3/2018 | Makino et al. | |
| 2019/0229339 A1 | 7/2019 | Maeda et al. | |
| 2022/0045329 A1 | 2/2022 | Matsuo et al. | |
| 2022/0190380 A1* | 6/2022 | Hirakawa ............. | H01M 10/48 |

FOREIGN PATENT DOCUMENTS

| CN | 102859780 A | 1/2013 |
|---|---|---|
| CN | 107112539 A | 8/2017 |
| CN | 107710469 A | 2/2018 |
| CN | 109643801 A | 4/2019 |
| JP | H0320906 A | 1/1991 |
| JP | 2008110899 A | 5/2008 |
| JP | 2012243476 A | 12/2012 |
| JP | 2013008485 A | 1/2013 |
| JP | 2013143299 A | 7/2013 |
| JP | 2014165131 A | 9/2014 |
| JP | 2016143614 A | 8/2016 |
| JP | 5987828 B2 | 9/2016 |
| JP | 2017117597 A | 6/2017 |
| KR | 1020190045182 A | 5/2019 |

(Continued)

OTHER PUBLICATIONS

Aug. 11, 2020, International Search Report issued in the International Patent Application No. PCT/JP2020/019520.
Charles M. Hansen, Hansen Solubility Parameters: A User's Handbook, Second Edition, 2007, CRC Press, Boca Raton FL.
Nov. 16, 2021, International Preliminary Report on Patentability issued in the International Patent Application No. PCT/JP2020/019520.
Apr. 24, 2023, the Extended European Search Report issued by the European Patent Office in the corresponding European Patent Application No. 20814774.4.

*Primary Examiner* — Eugenia Wang
(74) *Attorney, Agent, or Firm* — KENJA IP LAW PC

(57) ABSTRACT

Provided is a slurry composition for an all-solid-state secondary battery that has excellent fluidity and preservation stability and can form a solid electrolyte-containing layer having excellent ion conductivity. The slurry composition contains a solid electrolyte, a polymer, and a solvent. The ratio of fineness of grind of the solid electrolyte, as measured by a grind gauge method based on JIS K5600-2-5:1999, relative to the average primary particle diameter of the solid electrolyte is more than 1 and less than 30.

8 Claims, No Drawings

(56) References Cited

FOREIGN PATENT DOCUMENTS

| WO | 2011105574 A1 | 9/2011 |
| WO | 2012026583 A1 | 3/2012 |
| WO | 2012165120 A1 | 12/2012 |
| WO | 2013080989 A1 | 6/2013 |
| WO | 2016190304 A1 | 12/2016 |
| WO | 2017033600 A1 | 3/2017 |
| WO | 2017047379 A1 | 3/2017 |
| WO | 2018047821 A1 | 3/2018 |
| WO | 2020137435 A1 | 7/2020 |

* cited by examiner

SLURRY COMPOSITION FOR ALL-SOLID-STATE SECONDARY BATTERY, SOLID ELECTROLYTE-CONTAINING LAYER, ALL-SOLID-STATE SECONDARY BATTERY, AND METHOD OF PRODUCING SLURRY COMPOSITION FOR ALL-SOLID-STATE SECONDARY BATTERY

TECHNICAL FIELD

The present disclosure relates to a slurry composition for an all-solid-state secondary battery, a solid electrolyte-containing layer, an all-solid-state secondary battery, and a method of producing a slurry composition for an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

For this reason, all-solid-state secondary batteries in which a solid electrolyte is used instead of an organic solvent electrolyte having high flammability and high danger of ignition upon leakage are attracting attention as secondary batteries having high safety.

An all-solid-state secondary battery includes a positive electrode, a negative electrode, and a solid electrolyte layer positioned between the positive electrode and the negative electrode. The electrodes (positive electrode and negative electrode) of an all-solid-state secondary battery may each be formed by, for example, applying a slurry composition containing an electrode active material (positive electrode active material or negative electrode active material), a polymer serving as a binder, and a solid electrolyte onto a current collector and then drying the applied slurry composition to provide an electrode mixed material layer (positive electrode mixed material layer or negative electrode mixed material layer) on the current collector. Moreover, the solid electrolyte layer of an all-solid-state secondary battery may be formed by, for example, applying a slurry composition containing a polymer serving as a binder and a solid electrolyte onto an electrode or a releasable substrate, and then drying the applied slurry composition.

For example, Patent Literature (PTL) 1 proposes producing a slurry composition for an all-solid-state secondary battery using, as a binder, a polymer that includes a nitrile group-containing polymer unit in a proportion within a specific range and that has an iodine value within a specific range.

CITATION LIST

Patent Literature

PTL 1: WO2012/026583A1

SUMMARY

Technical Problem

However, the conventional slurry composition for an all-solid-state secondary battery described above leaves room for improvement in terms of increasing fluidity and preservation stability and also in terms of increasing ion conductivity of a layer containing a solid electrolyte (hereinafter, referred to as a "solid electrolyte-containing layer"), such as a solid electrolyte layer or an electrode mixed material layer, that is formed using the slurry composition.

Accordingly, one object of the present disclosure is to provide a slurry composition for an all-solid-state secondary battery that has excellent fluidity and preservation stability and can form a solid electrolyte-containing layer having excellent ion conductivity, and also to provide a method of producing this slurry composition for an all-solid-state secondary battery.

Another object of the present disclosure is to provide a solid electrolyte-containing layer that has excellent ion conductivity and an all-solid-state secondary battery that includes a solid electrolyte-containing layer having excellent ion conductivity.

Solution to Problem

The inventors conducted diligent investigation with the aim of solving the problems set forth above. The inventors reached a new finding that when a slurry composition contains a solid electrolyte, a polymer, and a solvent and when the ratio of fineness of grind of the solid electrolyte, as measured by a specific method, relative to the average primary particle diameter of the solid electrolyte is within a specific range, the slurry composition has excellent fluidity and preservation stability and can be used to form a solid electrolyte-containing layer having excellent ion conductivity. In this manner, the inventors completed the present disclosure.

Specifically, the present disclosure aims to advantageously solve the problems set forth above, and a presently disclosed slurry composition for an all-solid-state secondary battery comprises a solid electrolyte, a polymer, and a solvent, wherein a ratio of fineness of grind of the solid electrolyte, as measured by a grind gauge method based on JIS K5600-2-5:1999, relative to average primary particle diameter of the solid electrolyte is more than 1 and less than 30. A slurry composition for which the ratio of fineness of grind of a solid electrolyte relative to average primary particle diameter of the solid electrolyte (hereinafter, also referred to simply as "fineness of grind/average primary particle diameter") is within the range set forth above in this manner has excellent fluidity and preservation stability. Moreover, a solid electrolyte-containing layer that is formed using this slurry composition had excellent ion conductivity.

Note that the "average primary particle diameter" referred to in the present disclosure can be measured using a method described in the EXAMPLES section of the present specification.

Moreover, the "fineness of grind" referred to in the present disclosure can be measured by a grind gauge method based on JIS K5600-2-5:1999 as described above.

In the presently disclosed slurry composition for an all-solid-state secondary battery, the fineness of grind of the solid electrolyte is preferably less than 20 μm. When the fineness of grind of the solid electrolyte is less than the value set forth above, fluidity and preservation stability of the slurry composition can be further increased while also even further improving ion conductivity of a solid electrolyte-containing layer.

In the presently disclosed slurry composition for an all-solid-state secondary battery, the polymer preferably includes a vinyl cyanide monomer unit. When the polymer includes a vinyl cyanide monomer unit, fluidity and preservation stability of the slurry composition can be further increased while also even further improving ion conductivity of a solid electrolyte-containing layer.

The phrase "includes a monomer unit" as used in relation to a polymer in the present disclosure means that "a polymer obtained with the monomer includes a repeating unit derived from the monomer".

In the presently disclosed slurry composition for an all-solid-state secondary battery, the polymer preferably includes a (meth)acrylic acid ester monomer unit. When the polymer includes a (meth)acrylic acid ester monomer unit, fluidity and preservation stability of the slurry composition can be further increased while also even further improving ion conductivity of a solid electrolyte-containing layer.

Note that in the present disclosure, "(meth)acryl" is used to indicate "acryl and/or methacryl".

In the presently disclosed slurry composition for an all-solid-state secondary battery, the (meth)acrylic acid ester monomer unit preferably constitutes a proportion of not less than 25 mass % and not more than 95 mass % in the polymer. When the polymer includes a (meth)acrylic acid ester monomer unit in the proportion set forth above, fluidity and preservation stability of the slurry composition can be further increased while also even further improving ion conductivity of a solid electrolyte-containing layer.

Note that the proportion constituted by each repeating unit, such as a (meth)acrylic acid ester monomer unit, in a polymer can be measured by a nuclear magnetic resonance (NMR) method such as $^1$H-NMR or $^{13}$C-NMR.

In the presently disclosed slurry composition for an all-solid-state secondary battery, the solvent preferably includes an organic solvent having a solubility parameter (SP value) of not less than 6.0 $(cal/cm^3)^{1/2}$ and not more than 12.0 $(cal/cm^3)^{1/2}$. When an organic solvent having a solubility parameter (SP value) within the range set forth above is used as the solvent, fluidity and preservation stability of the slurry composition can be further improved. Moreover, a side reaction between the solid electrolyte and the solvent can be inhibited.

Note that the "solubility parameter (SP value)" referred to in the present disclosure is the Hansen solubility parameter ($\delta$) (units: $(cal/cm^3)^{1/2}$), which is expressed by a relationship "$\delta^2=\delta d^2+\delta p^2+\delta h^2$". In the preceding relationship, "$\delta d$" is a "term for the contribution of dispersion forces between molecules", "$\delta p$" is a "term for the contribution of polar interactions between molecules", and "$\delta h$" is a "term for the contribution of hydrogen bonds between molecules", and these are physical property values dependent on the type of material (refer to Charles M. Hansen, "Hansen Solubility Parameters: A User's Handbook, Second Edition", CRC Press, Boca Raton FL, (2007) (hereinafter, also referred to simply as "the handbook")). In the case of an organic solvent that is not described in the handbook or the like, it is possible to use a predicted value that is calculated using the computer software "Hansen Solubility Parameters in Practice (HSPiP)".

Moreover, the present disclosure aims to advantageously solve the problems set forth above, and a presently disclosed solid electrolyte-containing layer is formed using any one of the slurry compositions for an all-solid-state secondary battery set forth above. A solid electrolyte-containing layer that is formed using the slurry composition for an all-solid-state secondary battery set forth above can display excellent ion conductivity.

Furthermore, the present disclosure aims to advantageously solve the problems set forth above, and a presently disclosed all-solid-state secondary battery comprises the solid electrolyte-containing layer set forth above. By using the solid electrolyte-containing layer set forth above, an all-solid-state secondary battery that can display excellent battery performance is obtained.

Also, the present disclosure aims to advantageously solve the problem s set forth above, and a presently disclosed method of producing a slurry composition for an all-solid-state secondary battery comprises: a step of performing mixing treatment with respect to a composition that contains a solid electrolyte, a polymer, and a solvent and that has a solid content concentration of 70 mass % or more to produce a preliminary mixture; a step of further adding a solvent to the preliminary mixture having a solid content concentration of 70 mass % or more to obtain a diluted material having a solid content concentration of more than 40 mass % and less than 70 mass %; a step of performing kneading treatment with respect to the diluted material having a solid content concentration of more than 40 mass % and less than 70 mass % to produce a kneaded material; and a step of further adding a solvent to the kneaded material to dilute the kneaded material. A slurry composition that is obtained through the steps set forth above has excellent fluidity and preservation stability. Moreover, a solid electrolyte-containing layer that is formed using this slurry composition has excellent ion conductivity.

In the presently disclosed method of producing a slurry composition for an all-solid-state secondary battery, the polymer preferably includes a vinyl cyanide monomer unit. When the polymer includes a vinyl cyanide monomer unit, fluidity and preservation stability of a slurry composition can be further increased while also even further improving ion conductivity of a solid electrolyte-containing layer.

In the presently disclosed method of producing a slurry composition for an all-solid-state secondary battery, the polymer preferably includes a (meth)acrylic acid ester monomer unit. When the polymer includes a (meth)acrylic acid ester monomer unit, fluidity and preservation stability of a slurry composition can be further increased while also even further improving ion conductivity of a solid electrolyte-containing layer.

In the presently disclosed method of producing a slurry composition for an all-solid-state secondary battery, the (meth)acrylic acid ester monomer unit preferably constitutes a proportion of not less than 25 mass % and not more than 95 mass % in the polymer. When the polymer includes a (meth)acrylic acid ester monomer unit in the proportion set forth above, fluidity and preservation stability of a slurry composition can be further increased while also even further improving ion conductivity of a solid electrolyte-containing layer.

In the presently disclosed method of producing a slurry composition for an all-solid-state secondary battery, the solvent preferably includes an organic solvent having a solubility parameter (SP value) of not less than 6.0 $(cal/cm^3)^{1/2}$ and not more than 12.0 $(cal/cm^3)^{1/2}$. When an organic solvent having a solubility parameter (SP value) within the range set forth above is used as the solvent, fluidity and preservation stability of a slurry composition can be further increased. Moreover, a side reaction between the solid electrolyte and the solvent can be inhibited.

In the presently disclosed method of producing a slurry composition for an all-solid-state secondary battery, it is preferable that, in the step of producing the preliminary mixture, the mixing treatment is performed a plurality of times at different mixing subject solid content concentrations through solvent addition. When the preliminary mixture is produced as set forth above, fluidity and preservation stability of a slurry composition can be further increased while also even further improving ion conductivity of a solid electrolyte-containing layer.

Advantageous Effect

According to the present disclosure, it is possible to provide a slurry composition for an all-solid-state secondary battery that has excellent fluidity and preservation stability and can form a solid electrolyte-containing layer having excellent ion conductivity, and also to provide a method of producing this slurry composition for an all-solid-state secondary battery.

Moreover, according to the present disclosure, it is possible to provide a solid electrolyte-containing layer that has excellent ion conductivity and an all-solid-state secondary battery that includes a solid electrolyte-containing layer having excellent ion conductivity.

DETAILED DESCRIPTION

The following provides a detailed description of embodiments of the present disclosure.

The presently disclosed slurry composition for an all-solid-state secondary battery is used in formation of a solid electrolyte-containing layer, such as an electrode mixed material layer or a solid electrolyte layer, that is used in an all-solid-state secondary battery, such as an all-solid-state lithium ion secondary battery. Moreover, the presently disclosed slurry composition for an all-solid-state secondary battery can be produced using the presently disclosed method of producing a slurry composition for an all-solid-state secondary battery, for example. Furthermore, the presently disclosed all-solid-state secondary battery includes the presently disclosed solid electrolyte-containing layer formed using the presently disclosed slurry composition for an all-solid-state secondary battery as one or more layers selected from the group consisting of a positive electrode mixed material layer of a positive electrode, a negative electrode mixed material layer of a negative electrode, and a solid electrolyte layer.

Slurry Composition for all-Solid-State Secondary Battery

The presently disclosed slurry composition for an all-solid-state secondary battery contains a solid electrolyte, a polymer, and a solvent, and can optionally further contain one or more selected from the group consisting of an electrode active material, a conductive material, and other components. It is a requirement for the presently disclosed slurry composition for an all-solid-state secondary battery that a ratio of fineness of grind of the solid electrolyte, as measured by a grind gauge method based on JIS K5600-2-5:1999, relative to the average primary particle diameter of the solid electrolyte is more than 1 and less than 30.

The presently disclosed slurry composition for an all-solid-state secondary battery can be used to form a solid electrolyte-containing layer such as an electrode mixed material layer or a solid electrolyte layer as a result of containing a solid electrolyte and a polymer that can function as a binder. Moreover, the presently disclosed slurry composition for an all-solid-state secondary battery has excellent fluidity and preservation stability and can form a solid electrolyte-containing layer having excellent ion conductivity as a result of fineness of grind/average primary particle diameter of the solid electrolyte being more than 1 and less than 30.

Solid Electrolyte

Any particles formed of a solid that displays ion conductivity can be used as the solid electrolyte without any specific limitations, but the use of an inorganic solid electrolyte is preferable.

The inorganic solid electrolyte may be a crystalline inorganic ion conductor, an amorphous inorganic ion conductor, or a mixture thereof without any specific limitations. In a case in which the all-solid-state secondary battery is an all-solid-state lithium ion secondary battery, for example, the inorganic solid electrolyte is normally a crystalline inorganic lithium ion conductor, an amorphous inorganic lithium ion conductor, or a mixture thereof. Of such materials, it is preferable that the inorganic solid electrolyte includes either or both of a sulfide inorganic solid electrolyte and an oxide inorganic solid electrolyte from a viewpoint of forming a solid electrolyte-containing layer having excellent ion conductivity.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

Examples of crystalline inorganic lithium ion conductors include $Li_3N$, LISICON ($Li_{14}Zn(GeO_4)_4$), perovskite-type lithium ion conductors (for example, $Li_{0.5}La_{0.5}TiO_3$), garnet-type lithium ion conductors (for example, $Li_7La_3Zr_2O_{10}$), LIPON ($Li_{3+y}PO_{4-x}N_x$), and Thio-LISICON ($Li_{3.25}Ge_{0.25}P_{0.75}S_4$).

The crystalline inorganic lithium ion conductors described above may be used individually or as a mixture of two or more types.

The amorphous inorganic lithium ion conductor may, for example, be a sulfur atom-containing substance that displays ion conductivity. More specific examples include glass Li—Si—S—O, Li—P—S, and an amorphous inorganic lithium ion conductor obtained using a raw material composition containing $Li_2S$ and a sulfide of an element belonging to any one of groups 13 to 15 of the periodic table.

The element belonging to any one of groups 13 to 15 may be Al, Si, Ge, P, As, Sb, or the like, for example. Moreover, the sulfide of the element belonging to any one of groups 13 to 15 may, more specifically, be $Al_2S_3$, $SiS_2$, $GeS_2$, $P_2S_3$, $P_2S_5$, $As_2S_3$, $Sb_2S_3$, or the like, for example. The method by which the amorphous inorganic lithium ion conductor is synthesized using the raw material composition may be an amorphization method such as mechanical milling or melt quenching, for example. The amorphous inorganic lithium ion conductor that is obtained using the raw material composition containing $Li_2S$ and the sulfide of the element belonging to any one of groups 13 to 15 of the periodic table is preferably $Li_2S$—$P_2S_5$, $Li_2S$—$SiS_2$, $Li_2S$—$GeS_2$, or $Li_2S$—$Al_2S_3$, and more preferably $Li_2S$—$P_2S_5$.

The amorphous inorganic lithium ion conductors described above may be used individually or as a mixture of two or more types.

Of the examples described above, an amorphous sulfide containing Li and P or $Li_7La_3Zr_2O_{12}$ is preferable as the inorganic solid electrolyte for an all-solid-state lithium ion secondary battery from a viewpoint of forming a solid electrolyte-containing layer having excellent ion conductivity. As a result of having high lithium ion conductivity, an amorphous sulfide containing Li and P or $Li_7La_3Zr_2O_{12}$ can reduce the internal resistance of a battery and improve output characteristics of the battery when used as the inorganic solid electrolyte.

The amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S:P_2S_5$ is 65:35 to 85:15 from a viewpoint of reducing internal resistance and improving output characteristics of a battery. Moreover, the amorphous sulfide containing Li and P is preferably sulfide glass-ceramic that is obtained by reacting a mixed raw material of $Li_2S$ and $P_2S_5$ in which the molar ratio of $Li_2S:P_2S_5$ is 65:35 to 85:15 by a mechanochemical method. The molar ratio of $Li_2S:P_2S_5$ in the mixed raw material is preferably 68:32 to 80:20 from a viewpoint of maintaining a state of high lithium ion conductivity.

Note that the inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilized a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

The solid electrolyte is present as a plurality of particles (solid electrolyte particles) in the presently disclosed slurry composition. Moreover, at least some of the solid electrolyte particles are aggregated and present as aggregates in the presently disclosed slurry composition. These aggregates are aggregates that contain at least the solid electrolyte and can optionally contain the polymer serving as a binder and the like. The size of the aggregates is correlated with the fineness of grind, which is measured by a grind gauge method based on JIS K5600-2-5:1999 as previously described.

According to studies carried out by the inventors, the effects expected in the present disclosure can be achieved through the aforementioned fineness of grind and the average primary particle diameter of the solid electrolyte (i.e., the average particle diameter when the solid electrolyte particles are individually present) having a specific relationship.

More specifically, the fineness of grind/average primary particle diameter of the solid electrolyte in the presently disclosed slurry composition is required to be more than 1 and less than 30, is preferably more than 2, more preferably more than 3, and even more preferably 4 or more, and is preferably less than 25, more preferably less than 20, and even more preferably 16 or less. When the fineness of grind/average primary particle diameter of the solid electrolyte is more than 1 and less than 30, fluidity and preservation stability of the slurry composition can be increased, and ion conductivity of a solid electrolyte-containing layer can also be improved. Note that when the fineness of grind/average primary particle diameter of the solid electrolyte is 1 or less (normally 1), the ion conductivity of a solid electrolyte-containing layer decreases, which is presumed to be due to the polymer serving as a binder not covering the surface of the solid electrolyte and thus moisture or the like causing degradation of the solid electrolyte. On the other hand, when the fineness of grind/average primary particle diameter of the solid electrolyte is more than 30, fluidity and preservability of the slurry composition are lost due to excessive aggregation of the solid electrolyte. In addition, the ion conductivity of a solid electrolyte-containing layer decreases, which is presumed to be due to excessive aggregation of the solid electrolyte causing inadequate covering of the surface of the solid electrolyte by the polymer, and thus moisture or the like causing degradation of the solid electrolyte.

The average primary particle diameter of the solid electrolyte is preferably 0.1 μm or more, more preferably 0.2 μm or more, even more preferably 0.5 μm or more, and particularly preferably 1 μm or more, and is preferably 10 μm or less, more preferably 7 μm or less, even more preferably 5 μm or less, and particularly preferably 3 μm or less. When the average primary particle diameter of the solid electrolyte is 0.1 μm or more, fluidity and preservability of the slurry composition can be further increased, and ion conductivity of a solid electrolyte-containing layer can be even further improved. On the other hand, when the average primary particle diameter of the solid electrolyte is 10 μm or less, ion conductivity of a solid electrolyte-containing layer can be further improved.

The fineness of grind of the solid electrolyte, as measured by a grind gauge method based on JIS K5600-2-5:1999, is preferably more than 1 μm, more preferably more than 2 μm, and even more preferably more than 3 μm, and is preferably less than 20 μm, more preferably less than 15 μm, even more preferably less than 10 μm, and particularly preferably less than 7 μm. When the fineness of grind of the solid electrolyte is more than 1 μm, ion conductivity of a solid electrolyte-containing layer can be further improved. On the other hand, when the fineness of grind of the solid electrolyte is less than 20 μm, fluidity and preservability of the slurry composition can be further increased, and ion conductivity of a solid electrolyte-containing layer can be even further improved.

Note that the fineness of grind of the solid electrolyte can be adjusted by, for example, altering the average primary particle diameter of the solid electrolyte, the chemical composition of the polymer, the type of the solvent, the production conditions of the slurry composition, and so forth.

Polymer

The polymer may be any macromolecular compound that can function as a binder without any specific limitations.

The polymer is preferably a polymer that includes either or both of a vinyl cyanide monomer unit and a (meth)acrylic acid ester monomer unit from a viewpoint of dispersing the solid electrolyte well (i.e., lowering the fineness of grind of the solid electrolyte) through good covering of the surface of the solid electrolyte and further improving fluidity and preservability of the slurry composition and ion conductivity of a solid electrolyte-containing layer.

Note that the polymer may be one type of polymer used individually or may be two or more types of polymers used in combination.

Vinyl Cyanide Monomer Unit

Examples of vinyl cyanide monomers that can form a vinyl cyanide monomer unit include acrylonitrile, methacrylonitrile, α-chloroacrylonitrile, and α-ethylacrylonitrile. Of these vinyl cyanide monomers, acrylonitrile is preferable.

Note that the polymer may include just one type of vinyl cyanide monomer unit or may include two or more types of vinyl cyanide monomer units.

The proportion constituted by a vinyl cyanide monomer unit in the polymer when all repeating units (total of monomer units and structural units; same applies below) in the polymer are taken to be 100 mass % is preferably 2 mass % or more, more preferably 3 mass % or more, even more preferably 4 mass % or more, and particularly preferably 10 mass % or more, and is preferably 35 mass % or less, more preferably 28 mass % or less, and even more preferably 26 mass % or less. When the proportion constituted by a vinyl cyanide monomer unit in the polymer is 2 mass % or more, the solid electrolyte can be dispersed well. Consequently, fluidity and preservability of the slurry composition can be further increased, and ion conductivity of a solid electrolyte-containing layer can be even further improved. On the other hand, when the proportion constituted by a vinyl cyanide monomer unit in the polymer is 35 mass % or less, solubility of the polymer in the solvent does not excessively decrease, and dispersing ability of the polymer with respect to the solid electrolyte is ensured. Consequently, fluidity and preservability of the slurry composition and ion conductivity of a solid electrolyte-containing layer can be sufficiently improved.

(Meth)acrylic Acid Ester Monomer Unit

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, and 2-ethylhexyl acrylate; acrylic acid alkoxy esters such as 2-methoxyethyl acrylate and 2-ethoxyethyl acrylate; 2-(perfluoroalkyl) ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, and 2-ethylhexyl methacrylate; methacrylic acid alkoxy esters such as 2-methoxyethyl methacrylate and 2-ethoxyethyl methacrylate; 2-(perfluoroalkyl)ethyl methacrylates such as 2-(perfluorobutyl)ethyl methacrylate and 2-(perfluoropentyl)ethyl methacrylate; benzyl acrylate; and benzyl methacrylate. The term "(meth)acrylic acid ester monomer" is also inclusive of diesters of $\alpha,\beta$-ethylenically unsaturated dicarboxylic acids, examples of which include lower alkyl diesters of itaconic acid such as diethyl itaconate and dibutyl itaconate.

Of these (meth)acrylic acid ester monomers, methyl acrylate, ethyl acrylate, methyl methacrylate, n-butyl acrylate, t-butyl acrylate, and dibutyl itaconate are preferable, and ethyl acrylate and n-butyl acrylate are more preferable.

Note that the polymer may include just one type of (meth)acrylic acid ester monomer unit or may include two or more types of (meth)acrylic acid ester monomer units.

The proportion constituted by a (meth)acrylic acid ester monomer unit in the polymer when all repeating units in the polymer are taken to be 100 mass % is preferably 25 mass % or more, more preferably 30 mass % or more, and even more preferably 35 mass % or more, and is preferably 95 mass % or less, more preferably 90 mass % or less, even more preferably 85 mass % or less, and particularly preferably 75 mass % or less. When the proportion constituted by a (meth)acrylic acid ester monomer unit in the polymer is 25 mass % or more, the solid electrolyte can be dispersed well. Consequently, fluidity and preservability of the slurry composition can be further increased, and ion conductivity of a solid electrolyte-containing layer can be even further improved. On the other hand, when the proportion constituted by a (meth)acrylic acid ester monomer unit in the polymer is 95 mass % or less, solubility of the polymer in the solvent does not excessively decrease, and dispersing ability of the polymer with respect to the solid electrolyte is ensured. Consequently, fluidity and preservability of the slurry composition and ion conductivity of a solid electrolyte-containing layer can be sufficiently improved.

Other Repeating Units

The polymer can include repeating units other than the vinyl cyanide monomer unit and (meth)acrylic acid ester monomer unit described above. Preferable examples of such other repeating units include repeating units that are derived from monomers that are hydrophobic (hydrophobic monomers) such as an aromatic vinyl monomer unit, an aliphatic conjugated diene monomer unit, and an alkylene structural unit.

Note that when a monomer is referred to as "hydrophobic" in the present disclosure, this means that "solubility (25° C.) of the monomer itself in water is 1 g/l L or less". Also note that in the case of a monomer that corresponds to a vinyl cyanide monomer or a (meth)acrylic acid ester monomer, even when the monomer has a solubility (25° C.) in water of 1 g/l L or less, the monomer is considered to correspond to a vinyl cyanide monomer or a (meth)acrylic acid ester monomer and is not included among hydrophobic monomers.

Moreover, the polymer may include just one type of other repeating unit or may include two or more types of other repeating units.

Aromatic Vinyl Monomer Unit

Examples of aromatic vinyl monomers that can form an aromatic vinyl monomer unit include styrene, chlorostyrene, vinyltoluene, t-butylstyrene, vinylbenzoic acid, methyl vinylbenzoate, vinylnaphthalene, chloromethylstyrene, hydroxymethylstyrene, α-methylstyrene, and divinylbenzene.

Aliphatic Conjugated Diene Monomer Unit

Examples of aliphatic conjugated diene monomers that can form an aliphatic conjugated diene monomer unit include 1,3-butadiene, isoprene, 2,3-dimethyl-1,3-butadiene, and 1,3-pentadiene.

Alkylene Structural Unit

An alkylene structural unit is a repeating unit that is composed of only an alkylene structure represented by a general formula —$C_nH_{2n}$— (n is an integer of 2 or more). Although the alkylene structural unit may be linear or branched, the alkylene structural unit is preferably linear (i.e., is preferably a linear alkylene structural unit). The method by which the alkylene structural unit is introduced into the polymer is not specifically limited and may, for example, be either of the following methods (1) or (2).

(1) A method in which a monomer composition containing an aliphatic conjugated diene monomer is polymerized and then the resultant polymerized product is hydrogenated to convert an aliphatic conjugated diene monomer unit to an alkylene structural unit (2) A method in which a monomer composition containing a 1-olefin monomer is polymerized to produce a polymer Note that the aliphatic conjugated diene monomer used in method (1) may be any of the aliphatic conjugated diene monomers that were previously listed as aliphatic conjugated diene monomers that can form an aliphatic conjugated diene monomer unit. Of these aliphatic conjugated diene monomers, 1,3-butadiene is preferable. In other words, the alkylene structural unit obtained by method (1) is preferably a structural unit obtained through hydrogenation of an aliphatic conjugated diene monomer unit (i.e., is preferably a hydrogenated aliphatic conjugated diene unit), and more preferably a structural unit obtained through hydrogenation of a 1,3-butadiene unit (i.e., is more preferably a hydrogenated 1,3-butadiene unit). Selective hydrogenation of the aliphatic conjugated diene monomer unit can be carried out by a commonly known method such as an oil-layer hydrogenation method or a water-layer hydrogenation method.

Examples of 1-olefin monomers that can be used include ethylene, propylene, 1-butene, and 1-hexene. Of these 1-olefin monomers, ethylene is preferable.

These aliphatic conjugated diene monomers or 1-olefin monomers may be used individually or as a combination of two or more types.

A repeating unit that is derived from a hydrophobic monomer is preferable as another repeating unit from a viewpoint of dispersing the electrode active material, conductive material, or the like well in the slurry composition, with a styrene unit, a 1,3-butadiene unit, a hydrogenated 1,3-butadiene unit, and an ethylene unit being more preferable.

From a viewpoint of dispersing the electrode active material, conductive material, or the like well in the slurry composition, the proportion constituted by a repeating unit derived from a hydrophobic monomer in the polymer when all repeating units in the polymer are taken to be 100 mass % is preferably 10 mass % or more, more preferably 12 mass % or more, and even more preferably 14 mass % or more, and is preferably 60 mass % or less, more preferably 55 mass % or less, even more preferably 50 mass % or less, and particularly preferably 45 mass % or less.

Production Method

No specific limitations are placed on the method by which the polymer described above is produced, and the polymer may be produced by polymerizing a monomer composition that contains the monomers described above and then optionally hydrogenating the resultant polymerized product.

The polymerization method is not specifically limited and may be any of solution polymerization, suspension polymerization, bulk polymerization, and emulsion polymerization. Moreover, ionic polymerization, radical polymerization, living radical polymerization, or the like may be adopted as the polymerization reaction.

The method of hydrogenation is not specifically limited and may be a typical method using a catalyst (for example, refer to WO2012/165120A1, WO2013/080989A1, and JP2013-8485A).

Content

Although no specific limitations are placed on the amount of the polymer that is contained in the presently disclosed slurry composition, the amount of the polymer per 100 parts by mass of the solid electrolyte is preferably 0.1 parts by mass or more, more preferably 0.5 parts by mass or more, and even more preferably 1 part by mass or more, and is preferably 10 parts by mass or less, more preferably 8 parts by mass or less, and even more preferably 4 parts by mass or less. When the content of the polymer in the slurry composition is 0.1 parts by mass or more per 100 parts by mass of the solid electrolyte, the polymer can display sufficient functionality as a binder while also dispersing the solid electrolyte well. Consequently, fluidity and preservability of the slurry composition can be further increased, and ion conductivity of a solid electrolyte-containing layer can be even further improved. On the other hand, when the content of the polymer in the slurry composition is 10 parts by mass or less per 100 parts by mass of the solid electrolyte, ion conductivity of a solid electrolyte-containing layer can be sufficiently ensured.

Solvent

An organic solvent is preferably used as the solvent. The solubility parameter (SP value) of the organic solvent is preferably 6.0 $(cal/cm^3)^{1/2}$ or more, more preferably 6.5 $(cal/cm^3)^{1/2}$ or more, even more preferably 7.5 $(cal/cm^3)^{1/2}$ or more, and particularly preferably 8.0 $(cal/cm^3)^{1/2}$ or more, and is preferably 12.0 $(cal/cm^3)^{1/2}$ or less, more preferably 10.0 $(cal/cm^3)^{1/2}$ or less, even more preferably 9.5 $(cal/cm^3)^{1/2}$ or less, and particularly preferably 9.0 $(cal/cm^3)^{1/2}$ or less. By using an organic solvent that has a solubility parameter (SP value) within any of the ranges set forth above, the solid electrolyte can be dispersed well, and fluidity and preservation stability of the slurry composition can be further increased. Moreover, a side reaction between the solid electrolyte and the solvent can be inhibited.

More specifically, the solvent is preferably diisobutyl ketone (8.9), toluene (8.9), xylene (8.5), cyclopentyl methyl ether (8.4), butyl butyrate (8.1), dibutyl ether (7.4), hexane (7.3), or decane (6.5) from a viewpoint of further improving fluidity and preservation stability of the slurry composition while also inhibiting a side reaction between the solid electrolyte and the solvent, and is more preferably diisobutyl ketone, cyclopentyl methyl ether, toluene, butyl butyrate, or xylene. Note that the number in parentheses directly after each of the solvent names is the solubility parameter (SP value) (units: $(cal/cm^3)^{1/2}$).

These solvents may be used individually or as a mixture of two or more types.

Electrode Active Material

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

A positive electrode active material formed of an inorganic compound or a positive electrode active material formed of an organic compound may be used as a positive electrode active material for an all-solid-state lithium ion secondary battery without any specific limitations. Note that the positive electrode active material may be a mixture of an inorganic compound and an organic compound.

The positive electrode active material formed of an inorganic compound may be a transition metal oxide, a complex oxide of lithium and a transition metal (lithium-containing complex metal oxide), a transition metal sulfide, or the like. The aforementioned transition metal may be Fe, Co, Ni, Mn, or the like. Specific examples of inorganic compounds that can be used as the positive electrode active material include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

The positive electrode active materials formed of inorganic compounds described above may be used individually or as a mixture of two or more types.

The positive electrode active material formed of an organic compound may be polyaniline, polypyrrole, a polyacene, a disulfide compound, a polysulfide compound, an N-fluoropyridinium salt, or the like, for example.

The positive electrode active materials formed of organic compounds described above may be used individually or as a mixture of two or more types.

Allotropes of carbon such as graphite and coke may be used as a negative electrode active material for an all-solid-state lithium ion secondary battery. A negative electrode active material formed of an allotrope of carbon can be used in a mixed or coated form with a metal, metal salt, oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The negative electrode active materials described above may be used individually or as a mixture of two or more types.

Conductive Material

The conductive material is a component that is used to ensure electrical contact among the electrode active material in an electrode mixed material layer formed using the slurry composition for an all-solid-state secondary battery (slurry composition for an all-solid-state secondary battery electrode). Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

One of these conductive materials may be used individually, or two or more of these conductive materials may be used in combination.

The content of the conductive material in the slurry composition for an all-solid-state secondary battery per 100 parts by mass of the electrode active material is preferably 0.1 parts by mass or more, and more preferably 0.5 parts by mass or more, and is preferably 5 parts by mass or less, and more preferably 3 parts by mass or less. When the amount of the conductive material is within any of the ranges set forth above, electrical contact among the electrode active material can be sufficiently ensured, and an all-solid-state secondary battery can be caused to display excellent battery characteristics (output characteristics, etc.).

Other Components

Examples of other components that can optionally be contained in the slurry composition for an all-solid-state secondary battery include dispersants, leveling agents, defoamers, and reinforcing materials. In a case in which the all-solid-state secondary battery is an all-solid-state lithium ion secondary battery, for example, a lithium salt may be contained as another component. These other components are not specifically limited so long as they do not influence battery reactions.

Examples of other components such as lithium salts, dispersants, leveling agents, defoamers, and reinforcing materials that can be used include those described in JP2012-243476A, for example, but are not specifically limited thereto. Moreover, the amounts of these other components that are used may be the same as amounts described in JP2012-243476A, for example, but are not specifically limited thereto.

Properties

The solid content concentration of the slurry composition for an all-solid-state secondary battery is not specifically limited but can be set as not less than 30 mass % and less than 70 mass %, for example.

Method of Producing Slurry Composition for All-Solid-State Secondary Battery

The presently disclosed slurry composition set forth above can be produced using the presently disclosed method of producing a slurry composition for an all-solid-state secondary battery, for example. The presently disclosed production method includes: a step of performing mixing treatment with respect to a composition that contains a solid electrolyte, a polymer, and a solvent and that has a solid content concentration of 70 mass % or more to produce a preliminary mixture (preliminary mixing step); a step of further adding a solvent to the preliminary mixture having a solid content concentration of 70 mass % or more to obtain a diluted material having a solid content concentration of more than 40 mass % and less than 70 mass % (first dilution step); a step of performing kneading treatment with respect to the diluted material having a solid content concentration of more than 40 mass % and less than 70 mass % to produce a kneaded material (kneading step); and a step of further adding a solvent to the kneaded material to dilute the kneaded material (second dilution step).

A slurry composition that is obtained through the steps set forth above has excellent fluidity and preservation stability and can be used to form a solid electrolyte-containing layer having excellent ion conductivity.

Note that the presently disclosed method of producing a slurry composition set forth above may include steps other than the preliminary mixing step, the first dilution step, the kneading step, and the second dilution step.

Moreover, an electrode active material, a conductive material, and other components can optionally also be used in the presently disclosed method of producing a slurry composition set forth above in addition to a solid electrolyte, a polymer, and a solvent. The electrode active material, conductive material, and other components may be subjected to mixing treatment with the solid electrolyte, polymer, and solvent in the preliminary mixing step such that they are contained in the preliminary mixture, for example, but are not specifically limited to being used in this manner.

Moreover, the solid electrolyte, polymer, solvent, electrode active material, conductive material, and other components in the "method of producing a slurry composition for an all-solid-state secondary battery" can be the same as those described for the "slurry composition for an all-solid-state secondary battery", and preferred examples, preferred contents, and so forth of these components are also the same as described for the "slurry composition for an all-solid-state secondary battery".

Preliminary Mixing Step

In the preliminary mixing step, a composition (starting composition) that contains at least a solid electrolyte, a polymer, and a solvent is subjected to mixing treatment in a state in which the solid content concentration thereof is 70 mass % or more to produce a preliminary mixture that has a solid content concentration of 70 mass % or more. By performing mixing treatment of the composition having a solid content concentration of 70 mass % or more, it is possible to disperse the solid electrolyte well in an obtained slurry composition. Note that although no specific limitations are placed on the upper limit for the solid content concentration of the starting composition and the preliminary mixture, the upper limit for each thereof can be set as 90 mass % or less, for example.

A known device such as a planetary centrifugal mixer can be used without any specific limitations as a mixing device that is used for mixing treatment in the preliminary mixing step.

When obtaining the preliminary mixture in the preliminary mixing step, the solvent may be loaded into the mixing device all at once, continuously, or intermittently, but is more preferably loaded intermittently. Moreover, the mixing treatment may be performed a plurality of times at different mixing subject solid content concentrations in the preliminary mixing step through solvent addition. By changing the solid content concentration of the composition that is a mixing subject in stages from a high solid content concentration state to a low solid content concentration state while performing mixing treatment at each solid content concentration, the solid electrolyte can be dispersed well, and the fluidity and preservability of a slurry composition and the ion conductivity of a solid electrolyte-containing layer can be further improved.

The number of times that the mixing treatment is performed is not specifically limited but is preferably twice or more, and more preferably 3 times or more. When the number of times that mixing treatment is performed is twice or more, the solid electrolyte can be dispersed even better, and the fluidity and preservability of a slurry composition and the ion conductivity of a solid electrolyte-containing layer can be even further improved. On the other hand, the upper limit for the number of times that mixing treatment is performed is not specifically limited but is preferably 8 times or less, and more preferably 7 times or less from a viewpoint of slurry composition production efficiency.

No specific limitations are placed on the conditions of the mixing treatment. For example, the duration of each mixing treatment can be set within a range of not less than 10 seconds and not more than 10 minutes.

First Dilution Step

In the first dilution step, a solvent is added to the preliminary mixture obtained in the preliminary mixing step to obtain a diluted material (first diluted material) having a solid content concentration of more than 40 mass % and less than 70 mass %. The solvent that is added in the first dilution step may be the same solvent as used in the preliminary mixing step or may be a different solvent, but is preferably the same solvent.

Kneading Step

In the kneading step, the first diluted material having a solid content concentration of more than 40 mass % and less than 70 mass % that is obtained in the first dilution step is kneaded to obtain a kneaded material. By performing kneading treatment of the first diluted material having a solid content concentration within the range set forth above, sufficient shear can be applied to the first diluted material that is a kneading subject. As a consequence, the solid electrolyte can be dispersed well, and the fluidity and preservability of a slurry composition and the ion conductivity of a solid electrolyte-containing layer can be further improved.

A known device can be used as a kneading device used in the kneading treatment in the kneading step without any specific limitations so long as it can apply shear to the first diluted material that has a solid content concentration within the range set forth above. Moreover, the mixing device used in the preliminary mixing step may be used in the same form as the kneading device, for example.

Kneading treatment is preferably performed a plurality of times at different kneading subject solid content concentrations in the kneading step through solvent addition. By changing the solid content concentration of the first diluted material that is a kneading subject in stages from a high solid content concentration state to a low solid content concentration state while performing kneading treatment at each solid content concentration, the solid electrolyte can be dispersed well, and the fluidity and preservability of a slurry composition and the ion conductivity of a solid electrolyte-containing layer can be further improved.

The number of times that the kneading treatment is performed is not specifically limited but is preferably twice or more, and more preferably 3 times or more. When the number of times that kneading treatment is performed is twice or more, the solid electrolyte can be dispersed even better, and the fluidity and preservability of a slurry composition and the ion conductivity of a solid electrolyte-containing layer can be even further improved. On the other hand, the upper limit for the number of times that kneading treatment is performed is not specifically limited but is preferably 5 times or less, and more preferably 4 times or less from a viewpoint of slurry composition production efficiency.

No specific limitations are placed on the conditions of the kneading treatment. For example, the duration of each kneading treatment can be set within a range of not less than 10 seconds and not more than 10 minutes.

Second Dilution Step

In the second dilution step, a solvent is added to the kneaded material obtained in the kneading step. The solvent that is added in the second dilution step may be the same solvent as used in the preliminary mixing step and the first dilution step or may be a different solvent, but is preferably the same solvent.

Note that the kneaded material to which the solvent has been added in the second dilution step (i.e., a second diluted material) may be used in that form as a slurry composition or may be subjected to another step such as further mixing treatment and then be used as a slurry composition.

In the presently disclosed method of producing a slurry composition, the solid electrolyte may be ground in the preliminary mixing step, the first dilution step, the kneading step, and/or the second dilution step, for example. In other words, adjustment of the average primary particle diameter of the solid electrolyte may be performed when implementing the presently disclosed method of producing a slurry composition.

Solid Electrolyte-Containing Layer

The presently disclosed solid electrolyte-containing layer is a layer that contains a solid electrolyte and may, for example, be an electrode mixed material layer (positive electrode mixed material layer or negative electrode mixed material layer) that gives and receives electrons through electrochemical reactions, a solid electrolyte layer disposed between a positive electrode mixed material layer and a negative electrode mixed material layer that are in opposition to each other, or the like.

Moreover, the presently disclosed solid electrolyte-containing layer is a layer that is formed using the slurry composition for an all-solid-state secondary battery set forth above and can be formed by, for example, applying the slurry composition set forth above onto the surface of a suitable substrate to form a coating film, and subsequently drying the coating film that has been formed. In other words, the presently disclosed solid electrolyte-containing layer is formed of a dried product of the slurry composition set forth above, normally contains a solid electrolyte and a polymer, and can optionally further contain one or more selected from the group consisting of an electrode active material, a conductive material, and other components. Note that components contained in the solid electrolyte-containing layer are components that were contained in the slurry composition set forth above and the content ratio of these components is normally the same as the content ratio thereof in the slurry composition.

The presently disclosed solid electrolyte-containing layer can display excellent ion conductivity as a result of being formed from the presently disclosed slurry composition for an all-solid-state secondary battery.

Substrate

No limitations are placed on the substrate onto which the slurry composition is applied. For example, a coating film of the slurry composition may be formed on the surface of a releasable substrate, the coating film may be dried to form a solid electrolyte-containing layer, and then the releasable substrate may be peeled from the solid electrolyte-containing layer. The solid electrolyte-containing layer that has been peeled from the releasable substrate in this manner can be used as a free-standing film to form a battery member (for example, an electrode or a solid electrolyte layer) of an all-solid-state secondary battery.

However, it is preferable to use a current collector or an electrode as the substrate from a viewpoint of increasing battery member production efficiency through omission of a step of peeling the solid electrolyte-containing layer. More specifically, in production of an electrode mixed material layer, it is preferable that the slurry composition is applied onto a current collector serving as a substrate. Moreover, in production of a solid electrolyte layer, it is preferable that the slurry composition is applied onto an electrode (positive electrode or negative electrode).

Current Collector

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

Electrode

The electrode (positive electrode or negative electrode) is not specifically limited and may be an electrode that is obtained by forming an electrode mixed material layer containing an electrode active material, a solid electrolyte, and a binder for an electrode on a current collector such as described above.

The electrode active material, solid electrolyte, and binder for an electrode that are contained in the electrode mixed material layer of the electrode can be known examples thereof without any specific limitations. Note that the electrode mixed material layer of the electrode may be a layer that corresponds to the presently disclosed solid electrolyte-containing layer.

Formation Method of Solid Electrolyte-Containing Layer

Examples of methods by which the solid electrolyte-containing layer may be formed on a substrate such as the current collector or electrode described above include:
(1) a method in which the presently disclosed slurry composition is applied onto a surface of a substrate (surface at the electrode mixed material layer-side in the case of an electrode; same applies below) and is then dried;
(2) a method in which a substrate is immersed in the presently disclosed slurry composition and is then dried; and
(3) a method in which the presently disclosed slurry composition is applied onto a releasable substrate and is dried to produce a solid electrolyte-containing layer that is then transferred onto a surface of an electrode or the like.

Of these methods, method (1) is particularly preferable since it allows simple control of the thickness of the solid electrolyte-containing layer. In more detail, method (1) includes a step of applying the slurry composition onto a substrate (application step) and a step of drying the slurry composition that has been applied onto the substrate to form a solid electrolyte-containing layer (solid electrolyte-containing layer formation step).

Application Step

Examples of methods by which the slurry composition may be applied onto the substrate in the application step include, but are not specifically limited to, doctor blading, reverse roll coating, direct roll coating, gravure coating, extrusion coating, and brush coating.

Solid Electrolyte-Containing Layer Formation Step

The method by which the slurry composition on the substrate is dried in the solid electrolyte-containing layer formation step may be any commonly known method without any specific limitations. Examples of drying methods that may be used include drying by warm, hot, or low-humidity air, drying in a vacuum, and drying by irradiation with infrared light, electron beams, or the like.

In a case in which the solid electrolyte-containing layer is an electrode mixed material layer, pressing treatment is preferably performed by roll pressing or the like after drying. The pressing treatment enables further densification of the obtained electrode mixed material layer.

Electrode

An electrode that is obtained by forming an electrode mixed material layer on a current collector using the presently disclosed slurry composition for an all-solid-state secondary battery includes an electrode mixed material layer that contains a solid electrolyte, a polymer serving as a binder, and an electrode active material and optionally further contains one or more selected from the group consisting of a conductive material and other components, and can display excellent ion conductivity.

Solid Electrolyte Layer

A solid electrolyte layer that is formed using the presently disclosed slurry composition for an all-solid-state secondary battery contains a solid electrolyte and a polymer serving as a binder, optionally further contains other components, and can display excellent ion conductivity. Note that the solid electrolyte layer normally does not contain an electrode active material.

All-Solid-State Secondary Battery

The presently disclosed all-solid-state secondary battery normally includes a positive electrode, a solid electrolyte layer, and a negative electrode, and has the presently disclosed solid electrolyte-containing layer as one or more of a positive electrode mixed material layer of the positive electrode, a negative electrode mixed material layer of the negative electrode, and the solid electrolyte layer. In other words, the presently disclosed all-solid-state secondary battery includes one or more of: a positive electrode including a positive electrode mixed material layer that is formed using a slurry composition for an all-solid-state secondary battery positive electrode serving as the presently disclosed slurry composition for an all-solid-state secondary battery; a negative electrode including a negative electrode mixed material layer that is formed using a slurry composition for an all-solid-state secondary battery negative electrode serving as the presently disclosed slurry composition for an all-solid-state secondary battery; and a solid electrolyte layer that is formed using a slurry composition for an all-solid-state secondary battery electrolyte layer serving as the presently disclosed slurry composition for an all-solid-state secondary battery.

The presently disclosed all-solid-state secondary battery has excellent battery performance such as output characteristics as a result of including the presently disclosed solid electrolyte-containing layer.

Note that any electrode for an all-solid-state secondary battery can be used in the presently disclosed all-solid-state secondary battery as an electrode for an all-solid-state secondary battery including an electrode mixed material layer that does not correspond to the presently disclosed solid electrolyte-containing layer without any specific limitations so long as it includes an electrode mixed material layer that does not correspond to the presently disclosed solid electrolyte-containing layer.

Moreover, any solid electrolyte layer such as a solid electrolyte layer described in JP2012-243476A, JP2013-143299A, JP2016-143614A, or the like can be used without any specific limitations in the presently disclosed all-solid-state secondary battery as a solid electrolyte layer that does not correspond to the presently disclosed solid electrolyte-containing layer.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer, optionally performing pressing thereof to obtain a laminate, subsequently placing the laminate in a battery container in that form or after rolling, folding, or the like in accordance with the battery shape, and then sealing the battery container. An expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the examples and comparative examples, the following methods were used to evaluate the average primary particle diameter and fineness of grind of a solid electrolyte, the proportional content of each repeating unit in a polymer, the fluidity and preservation stability of a slurry composition, and the ion conductivity of a solid electrolyte-containing layer.

Average Primary Particle Diameter

The average primary particle diameter of a solid electrolyte was determined by observing 100 solid electrolyte particles under an electron microscope, measuring the particle diameter of each of the solid electrolyte particles in accordance with JIS Z8827-1:2008, and calculating the arithmetic mean of the measured values.

Fineness of Grind

The fineness of grind of a solid electrolyte was measured by a grind gauge method based on JIS K5600-2-5:1999.

Note that this measurement was performed using a PI-901 Grind Meter (produced by Tester Sangyo Co., Ltd.; measurement range: 0 μm to 100 μm).

Proportional Content of Each Repeating Unit

After coagulating 100 g of a binder composition in 1 L of methanol, vacuum drying was performed for 12 hours at a temperature of 60° C. The resultant dry polymer was analyzed by $^1$H-NMR. The proportional content (mass %) of each repeating unit included in the polymer was calculated based on the obtained analysis values.

Fluidity

The viscosity of a slurry composition was measured using a Brookfield B-type viscometer (60 rpm, 25° C.). A smaller value for the viscosity indicates that the slurry composition has better fluidity.
A: Viscosity of less than 3,000 mPa·s
B: Viscosity of not less than 3,000 mPa·s and less than 5,000 mPa·s.
C: Viscosity of not less than 5,000 mPa·s and less than 8,000 mPa·s.
D: Viscosity of not less than 8,000 mPa·s or not dispersed (lacking fluidity due to excessive aggregation such that viscosity measurement is not possible)

Preservation Stability

With respect to a slurry composition straight after production, 1 g thereof was dried by a 130° C. hot plate for 1 hour so as to vaporize solvent and measure the initial solid content concentration (%).

Separately to the above, the slurry composition straight after production was also stored in a hermetically sealed state at 25° C. After 1 week of storage, 1 g of supernatant of the slurry composition was sampled, and the post-storage solid content concentration (%) was measured in the same way as for the initial solid content concentration.

Next, the solid content concentration maintenance rate (=post-storage solid content concentration/initial solid content concentration×100(%)) was calculated. A larger solid content concentration maintenance rate indicates that there is a smaller degree of sedimentation of solid content and that the slurry composition has better preservation stability.
A: Solid content concentration maintenance rate of 90% or more
B: Solid content concentration maintenance rate of not less than 80% and less than 90%
C: Solid content concentration maintenance rate of not less than 50% and less than 80%
D: Solid content concentration maintenance rate of less than 50%

Ion Conductivity

First, a slurry composition was dried by a 130° C. hot plate inside a glovebox (moisture content: 1 ppm or less), and the resultant powder was shaped into a circular tube shape of 10 mm in diameter and 1 mm in thickness to obtain a measurement sample. Measurement of Li ion conductivity (25° C.) for the measurement sample was performed by the alternating current impedance method. This measurement was performed using a frequency response analyzer (produced by Solartron Analytical; product name: Solartron® 1260 (Solartron is a registered trademark in Japan, other countries, or both)) under measurement conditions of an applied voltage of 10 mV and a measurement frequency range of 0.01 MHz to 1 MHz. The obtained Li ion conductivity was taken to be $S_0$.

Separately to the above, the slurry composition was dried by a 130° C. hot plate inside a dry room (moisture content: 127 ppm or less; equivalent to dew point of −40° C.), and the resultant powder was shaped into a circular tube shape of 11.28 mm in diameter and 0.5 mm in thickness to obtain a measurement sample. Li ion conductivity (25° C.) was measured for this measurement sample in the same way as for $S_0$ described above. The obtained Li ion conductivity was taken to be $S_1$.

The conductivity maintenance rate (=$S_1/S_0 \times 100(\%)$) was determined and was evaluated by the following standard. A larger conductivity maintenance rate can be said to mean that degradation of the solid electrolyte by moisture is inhibited and indicates that a solid electrolyte-containing layer produced using the slurry composition can display better ion conductivity.
A: Conductivity maintenance rate of 90% or more
B: Conductivity maintenance rate of not less than 80% and less than 90%
C: Conductivity maintenance rate of not less than 50% and less than 80%
D: Conductivity maintenance rate of less than 50%

Example 1

Production of Binder Composition

A 1 L septum-equipped flask that included a stirrer was charged with 100 parts of deionized water and 0.2 parts of sodium dodecylbenzenesulfonate as an emulsifier, the gas phase was purged with nitrogen gas, and heating was performed to 60° C. Thereafter, 0.25 parts of potassium persulfate (KPS) as a polymerization initiator was dissolved in 20.0 parts of deionized water and was added into the flask.

Meanwhile, a monomer composition was obtained in a separate vessel by mixing 40 parts of deionized water, 1.0 parts of sodium dodecylbenzenesulfonate as an emulsifier, 15 parts of styrene as an aromatic vinyl monomer, 75 parts of n-butyl acrylate as a (meth)acrylic acid ester monomer, and 10 parts of acrylonitrile as a vinyl cyanide monomer. This monomer composition was continuously added into the 1 L septum-equipped flask over 3 hours to perform polymerization. The reaction was carried out at 60° C. during the addition. Once this addition was complete, a further 3 hours of stirring was performed at 80° C., and then the reaction was ended.

Next, an appropriate amount of butyl butyrate was added to the obtained water dispersion of a polymer so as to obtain a mixture. Distillation under reduced pressure was subsequently performed at 80° C. so as to remove water and excess butyl butyrate from the mixture and thereby yield a binder composition (butyl butyrate solution of polymer; solid content concentration: 8%). The proportional content of each repeating unit in the obtained polymer was measured. The results are shown in Table 1.

Production of Slurry Composition for All-Solid-State Secondary Battery

A slurry composition for an all-solid-state secondary battery was produced through multiple stages of mixing and kneading as described below.

Preliminary Mixing Step

Mixing (mixing treatment 1) was performed with respect to 100 parts of sulfide glass formed of Li$_2$S and P$_2$S$_5$ (Li$_2$S/P$_2$S$_5$=70 mol %/30 mol %; average primary particle diameter: 1.0 μm) as a solid electrolyte and 2 parts (in terms of solid content) of the binder composition described above. Butyl butyrate was then added to the mixture obtained through mixing treatment 1 to produce a composition having a solid content concentration of 80%. This composition was mixed (mixing treatment 2) for 2 minutes at 2,000 rpm using a planetary centrifugal mixer (product name: THINKY MIXER® ARE310 (THINKY MIXER is a registered trademark in Japan, other countries, or both); same applies below). Butyl butyrate was then added to the mixture obtained through mixing treatment 2 to produce a composition having a solid content concentration of 70%. This composition was mixed (mixing treatment 3) for 2 minutes at 2,000 rpm using the planetary centrifugal mixer.

First Dilution Step

Next, butyl butyrate was added to the mixture (preliminary mixture) having a solid content concentration of 70% that was obtained through mixing treatment 3 to produce a composition (first diluted material) having a solid content concentration of 65%.

Kneading Step

The first diluted material having a solid content concentration of 65% that was obtained through the first dilution step was kneaded (kneading treatment 1) for 2 minutes at 2,000 rpm using the planetary centrifugal mixer. Butyl butyrate was then added to the mixture obtained through kneading treatment 1 to produce a composition having a solid content concentration of 60%. This composition was mixed (kneading treatment 2) for 2 minutes at 2,000 rpm using the planetary centrifugal mixer. Butyl butyrate was then added to the mixture (solid content concentration: 60%) obtained through kneading treatment 2 to produce a composition having a solid content concentration of 55%. This composition was kneaded (kneading treatment 3) for 2 minutes at 2,000 rpm using the planetary centrifugal mixer.

Second Dilution Step

Next, butyl butyrate was added to the mixture (kneaded material) obtained through kneading treatment 3 to produce a composition (second diluted material) having a solid content concentration of 50%.

This composition was mixed for 2 minutes at 2,000 rpm using the planetary centrifugal mixer to produce a slurry composition for an all-solid-state secondary battery (solid content concentration: 50%).

Evaluations of fineness of grind, fluidity, preservation stability, and ion conductivity were performed. The results are shown in Table 1.

Examples 2 to 7

A slurry composition for an all-solid-state secondary battery was produced in the same way as in Example 1 with the exception that xylene (Example 2), toluene (Example 3), hexane (Example 4), decane (Example 5), cyclopentyl methyl ether (Example 6), or diisobutyl ketone (Example 7) was used instead of butyl butyrate in production of the binder composition and the slurry composition.

Evaluations were performed in the same way as in Example 1. The results are shown in Table 1.

Example 8

A slurry composition for an all-solid-state secondary battery was produced in the same way as in Example 1 with the exception that the amount of acrylonitrile was changed to 28 parts, the amount of n-butyl acrylate was changed to 62 parts, and the amount of styrene was changed to 10 parts in production of the binder composition.

Evaluations were performed in the same way as in Example 1. The results are shown in Table 1.

Example 9

A slurry composition for an all-solid-state secondary battery was produced in the same way as in Example 1 with the exception that the amount of acrylonitrile was changed to 3 parts, the amount of n-butyl acrylate was changed to 80 parts, and the amount of styrene was changed to 17 parts in production of the binder composition.

Evaluations were performed in the same way as in Example 1. The results are shown in Table 1.

Example 10

A slurry composition for an all-solid-state secondary battery was produced in the same way as in Example 1 with the exception that the amount of acrylonitrile was changed to 5 parts, the amount of n-butyl acrylate was changed to 90 parts, and the amount of styrene was changed to 5 parts in production of the binder composition.

Evaluations were performed in the same way as in Example 1. The results are shown in Table 1.

Example 11

A slurry composition for an all-solid-state secondary battery was produced in the same way as in Example 1 with the exception that 50 parts of n-butyl acrylate and 25 parts of ethyl acrylate were used instead of 75 parts of n-butyl acrylate as a (meth)acrylic acid ester monomer in production of the binder composition.

Evaluations were performed in the same way as in Example 1. The results are shown in Table 1.

Example 12

A slurry composition for an all-solid-state secondary battery was produced in the same way as in Example 1 with the exception that a binder composition produced as described below was used.

Evaluations were performed in the same way as in Example 1. The results are shown in Table 1.

Production of Binder Composition

After charging 2 parts of potassium oleate as an emulsifier, 0.1 parts of potassium phosphate as a stabilizer, and 150 parts of water to a reactor, 14 parts of acrylonitrile as a vinyl cyanide monomer, 43 parts of 1,3-butadiene as an aliphatic conjugated diene monomer, 43 parts of n-butyl acrylate as a (meth)acrylic acid ester monomer, and 0.31 parts of t-dodecyl mercaptan as a molecular weight modifier were further added, and then emulsion polymerization was initiated at 10° C. in the presence of 0.015 parts of ferrous sulfate as an activator and 0.05 parts of paramenthane hydroperoxide as a polymerization initiator. At the point at which the polymerization conversion rate reached 85%, 0.2 parts of hydroxylamine sulfate was added per 100 parts of monomer to terminate polymerization.

After termination of polymerization, heating was performed and unreacted monomer was collected through steam distillation at 70° C. under reduced pressure. Thereafter, 2 parts of alkylated phenol as an antioxidant was added to obtain a polymer latex.

Next, 400 mL of the obtained polymer latex (total solid content: 48 g) was loaded into a 1 L autoclave equipped with a stirrer, and nitrogen gas was passed for 10 minutes to remove dissolved oxygen in the polymer latex. Thereafter, 50 mg of palladium acetate as a hydrogenation reaction catalyst was dissolved in 180 mL of water to which 4 molar equivalents of nitric acid relative to Pd has been added, and was then added into the autoclave. Purging of the system with hydrogen gas was performed twice, and then the contents of the autoclave were heated to 50° C. in a state in which the pressure was raised to 3 MPa with hydrogen gas, and a hydrogenation reaction was carried out for 6 hours.

The contents of the autoclave were restored to normal temperature, the system was converted to a nitrogen atmosphere, and then concentrating was performed to a solid content concentration of 40% using an evaporator to yield a water dispersion of a polymer (hydrogenated nitrile rubber).

Next, an appropriate amount of butyl butyrate was added to the obtained water dispersion of the polymer so as to obtain a mixture. Distillation under reduced pressure was subsequently performed at 80° C. so as to remove water and excess butyl butyrate from the mixture and thereby obtain a binder composition (butyl butyrate solution of polymer; solid content concentration: 8%). The proportional content of each repeating unit in the obtained polymer was measured. The results are shown in Table 1.

Example 13

A slurry composition for an all-solid-state secondary battery was produced in the same way as in Example 12 with the exception that xylene was used instead of butyl butyrate in production of the binder composition and the slurry composition.

Evaluations were performed in the same way as in Example 1. The results are shown in Table 2.

Example 14

A slurry composition for an all-solid-state secondary battery was produced in the same way as in Example 12 with the exception that the amount of acrylonitrile was changed to 24 parts, the amount of 1,3-butadiene was changed to 33 parts, and the amount of n-butyl acrylate was changed to 43 parts in production of the binder composition.

Evaluations were performed in the same way as in Example 1. The results are shown in Table 2.

Example 15

Production of Binder Composition

A binder composition was produced in the same way as in Example 1.

Production of Slurry Composition for All-Solid-State Secondary Battery

A slurry composition for an all-solid-state secondary battery was produced through multiple stages of mixing and kneading as described below.

Preliminary Mixing Step

Mixing (mixing treatment 1) was performed with respect to 100 parts of sulfide glass formed of $Li_2S$ and $P_2S_5$ ($Li_2S/P_2S_5$=70 mol %/30 mol %; average primary particle diameter: 1.0 μm) as a solid electrolyte and 2 parts (in terms of solid content) of the binder composition described above. Butyl butyrate was then added to the mixture obtained through mixing treatment 1 to produce a composition having a solid content concentration of 70%. This composition was mixed (mixing treatment 2) for 2 minutes at 2,000 rpm using a planetary centrifugal mixer (product name: THINKY MIXER® ARE310; same applies below).

First Dilution Step

Next, butyl butyrate was added to the mixture (preliminary mixture) having a solid content concentration of 70% that was obtained through mixing treatment 2 to produce a composition (first diluted material) having a solid content concentration of 65%.

Kneading Step

The first diluted material having a solid content concentration of 65% that was obtained through the first dilution step was kneaded (kneading treatment 1) for 2 minutes at 2,000 rpm using the planetary centrifugal mixer.

Second Dilution Step

Next, butyl butyrate was added to the mixture (kneaded material) obtained through kneading treatment 1 to produce a composition (second diluted material) having a solid content concentration of 50%.

This composition was mixed for 2 minutes at 2,000 rpm using the planetary centrifugal mixer to produce a slurry composition for an all-solid-state secondary battery (solid content concentration: 50%).

Evaluations were performed in the same way as in Example 1. The results are shown in Table 2.

Example 16

A slurry composition for an all-solid-state secondary battery was produced in the same way as in Example 2 with the exception that an oxide inorganic solid electrolyte ($Li_7La_3Zr_2O_{12}$; average primary particle diameter: 1.2 μm) was used instead of sulfide glass formed of $Li_2S$ and $P_2S_5$ as a solid electrolyte in production of the slurry composition.

Evaluations were performed in the same way as in Example 1. The results are shown in Table 2.

Example 17

A slurry composition for an all-solid-state secondary battery was produced in the same way as in Example 13 with the exception that an oxide inorganic solid electrolyte ($Li_7La_3Zr_2O_{12}$; average primary particle diameter: 1.2 μm)

was used instead of sulfide glass formed of $Li_2S$ and $P_2S_5$ in production of the slurry composition.

Evaluations were performed in the same way as in Example 1. The results are shown in Table 2.

Comparative Example 1

Production of Binder Composition

A binder composition was produced in the same way as in Example 1.

Production of Slurry Composition for All-Solid-State Secondary Battery

A slurry composition for an all-solid-state secondary battery having a solid content concentration of 50% was produced by mixing 100 parts of sulfide glass formed of $Li_2S$ and $P_2S_5$ ($Li_2S/P_2S_5$=70 mol %/30 mol %; average primary particle diameter: 1.0 μm) as a solid electrolyte, 2 parts (in terms of solid content) of the binder composition described above, and butyl butyrate, all at once, using a planetary centrifugal mixer.

Evaluations were performed in the same way as in Example 1. The results are shown in Table 2.

Comparative Example 2

Production of Binder Composition

A binder composition was produced in the same way as in Example 2.

Production of Slurry Composition for All-Solid-State Secondary Battery

A slurry composition for an all-solid-state secondary battery having a solid content concentration of 50% was produced by mixing 100 parts of sulfide glass formed of $Li_2S$ and $P_2S_5$ ($Li_2S/P_2S_5$=70 mol %/30 mol %; average primary particle diameter: 1.0 μm) as a solid electrolyte, 2 parts (in terms of solid content) of the binder composition described above, and xylene, all at once, using a planetary centrifugal mixer.

Evaluations were performed in the same way as in Example 1. The results are shown in Table 2.

Comparative Example 3

Production of Binder Composition

A binder composition was produced in the same way as in Example 1.

Production of Slurry Composition for All-Solid-State Secondary Battery

A slurry composition for an all-solid-state secondary battery having a solid content concentration of 50% was produced by mixing 100 parts of an oxide inorganic solid electrolyte ($Li_7La_3Zr_2O_{12}$; average primary particle diameter: 1.2 μm) as a solid electrolyte, 2 parts (in terms of solid content) of the binder composition described above, and butyl butyrate, all at once, using a planetary centrifugal mixer.

Evaluations were performed in the same way as in Example 1. The results are shown in Table 2.

Comparative Example 4

A slurry composition for an all-solid-state secondary battery was produced in the same way as in Example 1 with the exception that the amount of acrylonitrile was changed to 40 parts, the amount of n-butyl acrylate was changed to 50 parts, and the amount of styrene was changed to 10 parts in production of the binder composition.

Evaluations were performed in the same way as in Example 1. The results are shown in Table 2.

Comparative Example 5

A slurry composition for an all-solid-state secondary battery was produced in the same way as in Example 1 with the exception that the amount of acrylonitrile was changed to 0 parts, the amount of n-butyl acrylate was changed to 90 parts, and the amount of styrene was changed to 10 parts in production of the binder composition.

Evaluations were performed in the same way as in Example 1. The results are shown in Table 2.

Comparative Example 6

A slurry composition for an all-solid-state secondary battery was produced in the same way as in Example 1 with the exception that N-methyl-2-pyrrolidone was used instead of butyl butyrate in production of the binder composition and the slurry composition.

Evaluations were performed in the same way as in Example 1. The results are shown in Table 2.

In Tables 1 and 2, shown below:
"Sulfide" indicates sulfide glass;
"Oxide" indicates $Li_7La_3Zr_2O_{12}$;
"AN" indicates acrylonitrile unit;
"BA" indicates n-butyl acrylate unit;
"EA" indicates ethyl acrylate unit;
"ST" indicates styrene unit;
"H-BD" indicates hydrogenated 1,3-butadiene unit;
"CPME" indicates cyclopentyl methyl ether;
"DIK" indicates diisobutyl ketone;
"NMP" indicates N-methyl-2-pyrrolidone; and
"All at once" indicates mixing all at once.

TABLE 1

| | | Example 1 | Example 2 | Example 3 | Example 4 | Example 5 | Example 6 |
|---|---|---|---|---|---|---|---|
| Solid electrolyte | Type | Sulfide | Sulfide | Sulfide | Sulfide | Sulfide | Sulfide |
| | Fineness of grind [μm] | 4 | 5 | 5 | 16 | 16 | 5 |
| | Average primary particle diameter [μm] | 1.0 | 1.0 | 1.0 | 1.0 | 1.0 | 1.0 |

TABLE 1-continued

|  |  |  |  |  |  |  |  |
|---|---|---|---|---|---|---|---|---|
|  | Fineness of grind/<br>Average primary<br>particle diameter [—] | 4.0 | 5.0 | 5.0 | 16.0 | 16.0 | 5.0 |
| Polymer | Vinyl<br>cyanide<br>monomer<br>unit | Type<br>Proportion<br>[mass %] | AN<br>10 | AN<br>10 | AN<br>10 | AN<br>10 | AN<br>10 | AN<br>10 |
|  | (Meth)<br>acrylic<br>acid ester<br>monomer<br>unit | Type<br>Proportion<br>[mass %] | BA<br>75 | BA<br>75 | BA<br>75 | BA<br>75 | BA<br>75 | BA<br>75 |
|  | monomer<br>unit | Type<br>Proportion<br>[mass %] | —<br>— | —<br>— | —<br>— | —<br>— | —<br>— | —<br>— |
|  | Other<br>repeating<br>unit | Type<br>Proportion<br>[mass %] | ST<br>15 | ST<br>15 | ST<br>15 | ST<br>15 | ST<br>15 | ST<br>15 |
| Solvent | SP value<br>[(cal/cm$^3$)$^{1/2}$]<br>Type | | 8.1<br>Butyl<br>butyrate | 8.5<br>Xylene | 8.9<br>Toluene | 7.3<br>Hexane | 6.5<br>Decane | 8.4<br>CPME |
| Production<br>method | Number of mixing<br>treatments (times)<br>Number of kneading<br>treatments (times) | | 3<br><br>3 | 3<br><br>3 | 3<br><br>3 | 3<br><br>3 | 3<br><br>3 | 3<br><br>3 |
|  | Fluidity<br>Preservation stability<br>Ion conductivity | | A<br>A<br>A | A<br>A<br>A | A<br>A<br>A | B<br>B<br>A | B<br>B<br>A | A<br>A<br>A |

|  |  |  | Example 7 | Example 8 | Example 9 | Example 10 | Example 11 | Example 12 |
|---|---|---|---|---|---|---|---|---|
| Solid<br>electrolyte | Type<br>Fineness of<br>grind [μm]<br>Average<br>primary particle<br>diameter [μm]<br>Fineness of grind/<br>Average primary<br>particle diameter [—] | | Sulfide<br>5<br><br>1.0<br><br>5.0 | Sulfide<br>8<br><br>1.0<br><br>8.0 | Sulfide<br>16<br><br>1.0<br><br>16.0 | Sulfide<br>12<br><br>1.0<br><br>12.0 | Sulfide<br>5<br><br>1.0<br><br>5.0 | Sulfide<br>5<br><br>1.0<br><br>5.0 |
| Polymer | Vinyl<br>cyanide<br>monomer<br>unit | Type<br>Proportion<br>[mass %] | AN<br>10 | AN<br>28 | AN<br>3 | AN<br>5 | AN<br>10 | AN<br>15 |
|  | (Meth)<br>acrylic<br>acid ester<br>monomer<br>unit | Type<br>Proportion<br>[mass %] | BA<br>75 | BA<br>62 | BA<br>80 | BA<br>90 | BA<br>50 | BA<br>40 |
|  | monomer<br>unit | Type<br>Proportion<br>[mass %] | —<br>— | —<br>— | —<br>— | —<br>— | EA<br>25 | —<br>— |
|  | Other<br>repeating<br>unit | Type<br>Proportion<br>[mass %] | ST<br>15 | ST<br>10 | ST<br>17 | ST<br>5 | ST<br>15 | H-BD<br>45 |
| Solvent | SP value<br>[(cal/cm$^3$)$^{1/2}$]<br>Type | | 8.9<br><br>DIK | 8.1<br><br>Butyl<br>butyrate | 8.1<br><br>Butyl<br>butyrate | 8.1<br><br>Butyl<br>butyrate | 8.1<br><br>Butyl<br>butyrate | 8.1<br><br>Butyl<br>butyrate |
| Production<br>method | Number of mixing<br>treatments (times)<br>Number of kneading<br>treatments (times) | | 3<br><br>3 | 3<br><br>3 | 3<br><br>3 | 3<br><br>3 | 3<br><br>3 | 3<br><br>3 |
|  | Fluidity<br>Preservation stability<br>Ion conductivity | | A<br>A<br>A | A<br>B<br>B | B<br>A<br>B | B<br>B<br>B | A<br>A<br>A | A<br>A<br>A |

TABLE 2

|  |  | Example 13 | Example 14 | Example 15 | Example 16 | Example 17 | Comparative Example 1 |
|---|---|---|---|---|---|---|---|
| Solid<br>electrolyte | Type<br>Fineness of<br>grind [μm]<br>Average<br>primary particle<br>diameter [μm] | Sulfide<br>5<br><br>1.0 | Sulfide<br>5<br><br>1.0 | Sulfide<br>29<br><br>1.0 | Oxide<br>8<br><br>1.2 | Oxide<br>8<br><br>1.2 | Sulfide<br>80<br><br>1.0 |

TABLE 2-continued

|  |  |  |  |  |  |  |  |  |
|---|---|---|---|---|---|---|---|---|
|  | Fineness of grind/ Average primary particle diameter [-] |  | 5.0 | 5.0 | 29.0 | 6.7 | 6.7 | 80.0 |
| Polymer | Vinyl cyanide monomer unit | Type | AN | AN | AN | AN | AN | AN |
|  |  | Proportion [mass %] | 15 | 25 | 10 | 10 | 15 | 10 |
|  | (Meth) acrylic acid ester monomer unit | Type | BA | BA | BA | BA | BA | BA |
|  |  | Proportion [mass %] | 40 | 40 | 75 | 75 | 40 | 75 |
|  |  | Type | — | — | — | — | — | — |
|  |  | Proportion [mass %] | — | — | — | — | — | — |
|  | Other repeating unit | Type | H-BD | H-BD | ST | ST | H-BD | ST |
|  |  | Proportion [mass %] | 45 | 35 | 15 | 15 | 45 | 15 |
| Solvent | SP value [(cal/cm$^3$)$^{1/2}$] |  | 8.5 | 8.5 | 8.1 | 8.5 | 8.5 | 8.1 |
|  | Type |  | Xylene | Xylene | Butyl butyrate | Xylene | Xylene | Butyl butyrate |
| Production method | Number of mixing treatments (times) |  | 3 | 3 | 2 | 3 | 3 | All at once |
|  | Number of kneading treatments (times) |  | 3 | 3 | 1 | 3 | 3 |  |
|  | Fluidity |  | A | A | B | A | A | D |
|  | Preservation stability |  | A | A | B | A | A | D |
|  | Ion conductivity |  | A | A | B | A | A | D |

|  |  |  | Comparative Example 2 | Comparative Example 3 | Comparative Example 4 | Comparative Example 5 | Comparative Example 6 |
|---|---|---|---|---|---|---|---|
| Solid electrolyte | Type |  | Sulfide | Oxide | Sulfide | Sulfide | Sulfide |
|  | Fineness of grind [μm] |  | 76 | 60 | 40 | 44 | 36 |
|  | Average primary particle diameter [μm] |  | 1.0 | 1.2 | 1.0 | 1.0 | 1.0 |
|  | Fineness of grind/ Average primary particle diameter [-] |  | 76.0 | 50.0 | 40.0 | 44.0 | 36.0 |
| Polymer | Vinyl cyanide monomer unit | Type | AN | AN | AN | — | AN |
|  |  | Proportion [mass %] | 10 | 10 | 40 | — | 10 |
|  | (Meth) acrylic acid ester monomer unit | Type | BA | BA | BA | BA | BA |
|  |  | Proportion [mass %] | 75 | 75 | 50 | 90 | 75 |
|  |  | Type | — | — | — | — | — |
|  |  | Proportion [mass %] | — | — | — | — | — |
|  | Other repeating unit | Type | ST | ST | ST | ST | ST |
|  |  | Proportion [mass %] | 15 | 15 | 10 | 10 | 15 |
| Solvent | SP value [(cal/cm$^3$)$^{1/2}$] |  | 8.5 | 8.1 | 8.1 | 8.1 | 10.6 |
|  | Type |  | Xylene | Butyl butyrate | Butyl butyrate | Butyl butyrate | NMP |
| Production method | Number of mixing treatments (times) |  | All at once | All at once | 3 | 3 | 3 |
|  | Number of kneading treatments (times) |  |  |  | 3 | 3 | 3 |
|  | Fluidity |  | D | D | C | C | C |
|  | Preservation stability |  | D | D | C | C | D |
|  | Ion conductivity |  | D | C | C | C | D |

It can be seen from Tables 1 and 2 that in each of Examples 1 to 17, the slurry composition for an all-solid-state secondary battery has excellent fluidity and preservation stability and can form a solid electrolyte-containing layer having excellent ion conductivity.

On the other hand, it can be seen from Table 2 that in each of Comparative Examples 1 to 6 where the fineness of grind/average primary particle diameter is outside of a specific range, the slurry composition for an all-solid-state secondary battery has poor fluidity and preservation stability and cannot form a solid electrolyte-containing layer having excellent ion conductivity.

INDUSTRIAL APPLICABILITY

According to the present disclosure, it is possible to provide a slurry composition for an all-solid-state secondary battery that has excellent fluidity and preservation stability and can form a solid electrolyte-containing layer having excellent ion conductivity, and also to provide a method of producing this slurry composition for an all-solid-state secondary battery.

Moreover, according to the present disclosure, it is possible to provide a solid electrolyte-containing layer that has excellent ion conductivity and an all-solid-state secondary battery that includes a solid electrolyte-containing layer having excellent ion conductivity.

The invention claimed is:

1. A slurry composition for an all-solid-state secondary battery comprising a solid electrolyte, a polymer, and a solvent, wherein
   a ratio of fineness of grind of the solid electrolyte, as measured by a grind gauge method based on JIS K5600-2-5:1999, relative to an average primary particle diameter of the solid electrolyte is more than 1 and less than 30,
   the solid electrolyte is present as a plurality of solid electrolyte particles, and some of the solid electrolyte particles are aggregated and present as aggregates,
   the average primary particle diameter of the solid electrolyte is determined by observing 100 primary particles, each being a solid electrolyte particle existing independently, among the plurality of solid electrolyte particles under an electron microscope, measuring a particle diameter of each of the primary particles in accordance with JIS Z8827-1:2008, and calculating the arithmetic mean of the measured values.

2. The slurry composition for an all-solid-state secondary battery according to claim 1, wherein the fineness of grind of the solid electrolyte is less than 20 µm.

3. The slurry composition for an all-solid-state secondary battery according to claim 1, wherein the polymer includes a vinyl cyanide monomer unit.

4. The slurry composition for an all-solid-state secondary battery according to claim 1, wherein the polymer includes a (meth)acrylic acid ester monomer unit.

5. The slurry composition for an all-solid-state secondary battery according to claim 4, wherein the (meth)acrylic acid ester monomer unit constitutes a proportion of not less than 25 mass % and not more than 95 mass % in the polymer.

6. The slurry composition for an all-solid-state secondary battery according to claim 1, wherein the solvent includes an organic solvent having a solubility parameter (SP value) of not less than 6.0 $(cal/cm^3)^{1/2}$ and not more than 12.0 $(cal/cm^3)^{1/2}$.

7. A solid electrolyte-containing layer formed using the slurry composition for an all-solid-state secondary battery according to claim 1.

8. An all-solid-state secondary battery comprising the solid electrolyte-containing layer according to claim 7.

* * * * *